United States Patent
Alexander et al.

(10) Patent No.: US 8,204,354 B2
(45) Date of Patent: *Jun. 19, 2012

(54) SYSTEM AND METHOD FOR CONTROLLING A DIGITAL VIDEO RECORDER IN RESPONSE TO A TELEPHONE STATE TRANSITION

(75) Inventors: Paul Alexander, Sanford, NC (US); Christopher P. Williams, Oak Hill, VA (US); Kenneth Gould, Herndon, VA (US); David Christman, Rowayton, CT (US)

(73) Assignee: Time Warner Cable, Inc., New York, NY (US)

( * ) Notice: Subject to any disclaimer, the term of this patent is extended or adjusted under 35 U.S.C. 154(b) by 889 days.

This patent is subject to a terminal disclaimer.

(21) Appl. No.: 12/269,169

(22) Filed: Nov. 12, 2008

(65) Prior Publication Data

US 2009/0060152 A1 Mar. 5, 2009

Related U.S. Application Data

(63) Continuation of application No. 11/001,513, filed on Dec. 1, 2004, now Pat. No. 7,486,869.

(51) Int. Cl.
*H04N 5/765* (2006.01)
(52) U.S. Cl. ........................ 386/200; 348/552
(58) Field of Classification Search .................. 386/326, 386/200, 231; 725/106, 80, 153
See application file for complete search history.

(56) References Cited

U.S. PATENT DOCUMENTS

| | | |
|---|---|---|
| 5,774,186 A | 6/1998 | Brodsky et al. |
| 6,628,964 B1 | 9/2003 | Bates et al. |
| 7,184,522 B2 | 2/2007 | Brunelle et al. |
| 7,206,497 B1 * | 4/2007 | Boyle et al. ................... 386/291 |
| 7,317,793 B2 * | 1/2008 | Binder et al. .................. 379/413 |
| 7,486,869 B2 * | 2/2009 | Alexander et al. ............ 386/200 |
| 7,522,579 B1 * | 4/2009 | Mangal et al. ................ 370/352 |
| 7,647,617 B2 * | 1/2010 | Bartfeld et al. ............... 725/122 |
| 2001/0038690 A1 * | 11/2001 | Palmer et al. ............ 379/218.01 |
| 2002/0124267 A1 * | 9/2002 | Bortolini et al. .............. 725/131 |
| 2003/0041331 A1 * | 2/2003 | Allen et al. ................... 725/106 |
| 2003/0086432 A1 * | 5/2003 | Bartfeld et al. ............... 370/401 |
| 2003/0114112 A1 * | 6/2003 | Strater et al. ................. 455/67.1 |

(Continued)

FOREIGN PATENT DOCUMENTS

GB 2302778 A 1/1997

(Continued)

*Primary Examiner* — David Harvey
(74) *Attorney, Agent, or Firm* — The Marbury Law Group PLLC

(57) ABSTRACT

A system and method for controlling a digital video recorder on a cable network. Signaling associated with the answering or initiation of a digital telephone call by a digital telephone subscriber is used to issue commands to a digital video recorder (DVR). A signal is generated by an MTA when the telephone is enters an "off-hook" state and sent to the DVR to initiate recording of a program being viewed by the called party. When the phone goes "on-hook", the called party resumes watching the program from exactly where it was interrupted. The MTA may be connected directly to the VTD/DVR and the telephone state is determined by the DVR from information provided by the MTA. Alternatively, a soft switch monitors signaling from the MTA indicative of the state of the called telephone. A telephone state message comprising the telephone state information is then sent over an out-of-band channel/path to a DVR client within the VTD. The DVR client uses the telephone state information to control a DVR.

21 Claims, 7 Drawing Sheets

U.S. PATENT DOCUMENTS

| | | |
|---|---|---|
| 2003/0126256 A1* | 7/2003 | Cruickshank et al. ........ 709/224 |
| 2003/0163310 A1* | 8/2003 | Caldwell et al. .............. 704/235 |
| 2004/0090968 A1* | 5/2004 | Kimber et al. ........... 370/395.54 |
| 2004/0121726 A1* | 6/2004 | Bifano et al. ..................... 455/8 |
| 2004/0176132 A1 | 9/2004 | Thrasher |
| 2004/0177378 A1 | 9/2004 | Cool |
| 2005/0044573 A1 | 2/2005 | Preschutti |
| 2005/0055708 A1* | 3/2005 | Gould et al. .................... 725/25 |
| 2006/0048202 A1* | 3/2006 | Bontempi et al. ............ 725/118 |

FOREIGN PATENT DOCUMENTS

WO      WO 03/019945 A1     3/2003

* cited by examiner

SYSTEM AND METHOD FOR CONTROLLING A DIGITAL VIDEO RECORDER IN RESPONSE TO A TELEPHONE STATE TRANSITION

RELATIONSHIP TO OTHER APPLICATIONS

This application is a continuation of U.S. application Ser. No. 11/001,513, filed Dec. 1, 2004 now U.S. Pat. No. 7,486,869, which application is incorporated herein by reference for all purposes and from which priority is claimed.

BACKGROUND

Embodiments of the present invention relate generally to signaling in a voice over IP (VoIP) network. More particularly, embodiments of the present invention relate to using VoIP signaling to control a digital video recorder (DVR) in a cable network.

The increasing availability of high-speed data services and broadband connections has accelerated the integration of telecommunications services offered to consumers and businesses alike. Hybrid fiber cable (HFC) systems now offer a wide-range of services from digital video to Internet to voice over IP (VoIP) services. The boundaries between these services continue to erode with video terminating equipment (the "set top box" or "STB") providing subscribers access to data and voice services.

A digital telephone subscriber receives telephone calls via a data connection that terminates on the subscriber's premises a multimedia terminal adapter (MTA). The data stream to the MTA and carries both a control signal and an information signal (voice).

While access to telephone communications services is generally considered a necessity, receiving unwanted or untimely calls has become a major source of irritation to telephone service subscribers. Caller ID, caller ID screening, and answering services are available to filter out undesired calls. However, even calls that a subscriber may want to answer may come at an inopportune time. Specifically, an important call that comes during the viewing of a television program presents the subscriber with several sub-optimal choices. The subscriber may attempt to watch the program while talking on the telephone, thereby providing distracted attention to both the program and the caller. The subscriber may attempt to manually record the program either before answering the call or while talking, thereby risking missing the call or some or the entire program. Or the subscriber may simply elect to miss the program altogether.

Similarly, a subscriber may want to make a phone call during a program for any number of reasons. For example, the subscriber may want to order an advertised product, order food, or call a friend to discuss a program.

What would be useful is a system and method for automatically recording a program from a point where a call is answered or initiated by a digital telephone subscriber thereby allowing the subscriber to resume watching the program from answering or initiation point through the end of the program.

SUMMARY

In an embodiment of the present invention, the signaling associated with the answering or initiation of a digital telephone call by a digital telephone subscriber is used to instruct a video termination device (VTD) comprising a digital video recorder (DVR) to record a program that is being viewed by the digital telephone subscriber. In this embodiment, a signal is generated by an MTA when the telephone is enters an "off-hook" state and sent to the DVR to initiate recording of a program being viewed by a subscriber. When the phone goes "on-hook", the subscriber resumes watching the program from exactly where it was interrupted. In one embodiment of the present invention, the MTA is connected directly to the VTD/DVR and the telephone state is determined by the DVR from information provided by the MTA.

In yet another embodiment of the present invention, a soft switch monitors signaling from the MTA indicative of the state of a subscriber telephone. A telephone state message comprising the telephone state information is then sent over the out-of-band channel/path to a DVR client within the VTD. The VTD uses the telephone state information to control a DVR. In another embodiment of the present invention, the telephone state information is provided to the DVR via an infrared control module.

It is therefore an aspect of the present invention to detect when a telephone state transitions from "on-hook" to "off-hook" and from "off-hook" to "on-hook" and to control a device based on a transition of state of the telephone.

It is another aspect of the present invention to detect state transitions of a telephone configured to provide VoIP telephone service over a cable network using the "off-hook" and "on-hook" signals produced by a media terminal adapter.

It is still another aspect of the present invention to use the state transitions of a VoIP telephone operating over a cable network to control a device connected to the cable network.

It is yet another aspect of the present invention to detect the state transitions of a telephone from the position of the "hook switch" of the telephone.

It is an aspect of the present invention to control a device connected to the cable network via control signals sent to the device using a remote control responsive to the state transitions of a telephone.

It is another aspect of the present invention to initiate the recording of a television program on a digital video recorder (DVR) when a telephone transitions to an "off-hook" state.

It yet another aspect of the present invention to end the recording of a television program on a DVR when a telephone transitions to an "on-hook" state.

It is an aspect of the present invention to associate a cable subscriber's telephone number with the MAC and/or IP address of the subscriber's VTD and with the MAC and/or IP address of the subscriber's VTD.

It is another aspect of the present invention to send telephone state information to a DVR by addressing a message to the IP address of a DOCSIS-compliant VTD.

These and other aspects of the present invention will be apparent from a review of the general and detailed descriptions that follow.

An embodiment of the present invention provides a method for controlling a digital video recorder (DVR) in response to a telephone state transition. A telephone state transition is detected. In an embodiment of the present invention, a telephone state transition comprises a change of the telephone state from an on-hook state to an off-hook state. In another embodiment of the present invention, the telephone state transition comprises a change of the telephone state from an off-hook state to an on-hook state.

In an embodiment of the present invention, the telephone state transition is detected at a media terminal adapter (MTA) connected to a telephone. At boot-up of the MTA, a configuration file comprising a fully qualified domain name of a video termination device (VTD) is received. The message to the VTD is addressed using the fully qualified domain name of the VTD.

In an embodiment of the present invention, the VTD comprises a set top box. In another embodiment of the present invention, the VTD comprises a cable-ready video display device.

The telephone state transition is sent to the DVR. In an embodiment of the present invention, sending the telephone state transition to the DVR is accomplished by creating a message comprising data indicative of the telephone state transition. The message is sent via an out-of-band channel to the VTD in which the DVR resides. In an embodiment of the present invention, the out-of-band channel is an RF-channel. In another embodiment of the present invention, the VTD is DOCSIS-compliant and the out-of-band channel is a DOCSIS channel.

A command responsive to the telephone state transition is issued to the DVR. In an embodiment of the present invention, issuing the command to the DVR responsive to the telephone state transition comprises issuing a "PAUSE" command if the telephone state transition information is a change from an "on-hook" state to an "off-hook" state. In another embodiment of the present invention, issuing the command to the DVR responsive the telephone state transition comprises issuing a "PLAY" command if the telephone state transition information is a change from an "off-hook" state to an "on-hook" state.

In an embodiment of the present invention, a system for controlling a digital video recorder (DVR) in response to a telephone state transition in a cable network comprises a telephone, a media terminal adapter (MTA), and a DVR. The telephone is connected to the cable network via the MTA. The MTA detects a telephone state transition and sends a telephone state message comprising data indicative of the telephone state transition to the DVR via an out-of-band channel.

In another embodiment of the present invention, the telephone state message further comprises the address of a video termination device (VTD) in which the DVR resides. In an embodiment of the present invention, the VTD comprises a set top box. In another embodiment of the present invention, the VTD comprises a cable-ready video display device. In an embodiment of the present invention, the out-of-band channel is an RF-channel. In another embodiment of the present invention, the VTD is DOCSIS-compliant and the out-of-band channel is a DOCSIS channel.

In still another embodiment of the present invention, the MTA is associated with a subscriber and the MTA is further adapted to receive a configuration file comprising a list of fully qualified domain names of VTDs associated with the subscriber, and wherein the address of the VTD is the fully qualified domain name of the VTD.

The DVR obtains the data indicative of the telephone state transition from the telephone state message, generates a DVR command from the telephone state transition, and issues the DVR command to the DVR, thereby controlling the DVR in response to the telephone state transition.

In an embodiment of the present invention, the telephone state transition comprises a change of the telephone from an on-hook state to an off-hook state. In this embodiment, the DVR command comprises a PAUSE command. In another embodiment of the present invention, the telephone state transition comprises a change of the telephone from an off-hook state to an on-hook state. In this embodiment, the DVR command comprises a PLAY command.

An embodiment of the present invention provides a method for controlling a digital video recorder (DVR) of a subscriber in response to a telephone state transition. An invitation message is received from a soft switch, wherein the invitation message comprises data indicative of a telephone state transition. The invitation message is forwarded to video termination device (VTD) servers. A determination is made at a VTD server whether to process the invitation message. If the invitation message is processed, then a telephone state message comprising the data indicative of the telephone state transition is created. The telephone state message is addressed to a VTD in which the DVR resides. The telephone state message is sent via an out-of-band channel to the VTD.

In an embodiment of the present invention, the invitation message further comprises a user value. In this embodiment, the user value in the invitation message is determined and the invitation message forwarded to the VTD servers registered to the user value.

In another embodiment of the present invention, a proxy server forwards the invitation message. In this embodiment, if the called party is registered with the VTD server, the proxy server is sent an "OK" response message comprising an acknowledgement of the invitation message. The proxy server sends a cancellation message to the VTD servers from which the "OK" response is not received.

In an embodiment of the present invention, an invitation message further comprises identifying information of the subscriber. In this embodiment, a first tuple comprising a subscriber telephone number and an assigned VTD MAC address is received from a central datastore. A second tuple comprising a read VTD MAC address and a VTD IP address is received from the VTD. A determination is made whether the assigned VTD MAC address matches the read VTD MAC address. If the assigned VTD MAC address matches the read VTD MAC address, a third tuple comprising the subscriber telephone number and the VTD IP address is created. A determination is made whether the identifying information of the subscriber matches the subscriber telephone number of the third tuple. In an embodiment of the present invention, the third tuple comprises the subscriber telephone number, the read VTD MAC address, and the VTD IP address. If the identifying information of the called party matches the subscriber telephone number of the third tuple, then the invitation request is processed.

In an embodiment of the present invention, the out-of-band channel is an RF-channel. In another embodiment of the present invention, the VTD is DOCSIS-compliant and the out-of-band channel is a DOCSIS channel.

In an embodiment of the present invention, the telephone state message is received at a DVR client associated within the VTD. A determination is made whether the telephone state message is intended for the VTD. If the telephone state message is intended for the VTD, the telephone state transition is obtained from the telephone state message. A DVR command is generated from the telephone state transition, the DVR command is issued to the DVR, thereby controlling the DVR in response to the telephone state transition.

In an embodiment of the present invention, the telephone state message further comprises a destination IP address. Determining if the telephone state message is intended for the VTD comprises determining if the destination IP address matches the IP address of the VTD.

In another embodiment of the present invention, the telephone state message further comprises a destination MAC address. Determining if the telephone state message is intended for the VTD comprises determining if the destination MAC address matches the MAC address of the VTD.

In another embodiment of the present invention, the telephone state message further comprises a destination IP address and a destination MAC address and determining if the telephone state message is intended for the VTD comprises determining if the destination MAC address and destination IP address match the IP and MAC address of the VTD. In another embodiment of the present invention, if the telephone state message is not intended for the VTD, an error message is sent from the VTD to the VTD server.

In an embodiment of the present invention, a system for controlling a digital video recorder (DVR) in response to a telephone state transition in a cable network comprises a regional data center, a headend, and a video termination device (VTD). The headend provides video services to subscribers and comprises a VTD server. The regional data center provides digital services to a subscriber of the cable network and comprises a softswitch and a proxy server. The proxy server receives an invitation message from the soft switch. The invitation message comprises an active telephone number of the subscriber and data indicative of a telephone state transition of a telephone using the active telephone number. The proxy server forwards the invitation message to the VTD server. The VTD server parses the invitation message to obtain data indicative of a telephone state transition and the active telephone number of the subscriber. The VTD server creates a telephone state message comprising the data indicative of a telephone state transition. The VTD server addresses the telephone state message to a VTD in which the DVR resides and associated with the active telephone number, and sends the telephone state message via an out-of-band channel to the VTD to control the operation of the DVR.

In an embodiment of the present invention, a telephone state transition comprises a change of a telephone from an on-hook state to an off-hook state. In another embodiment of the present invention, the telephone state transition comprises a change of a telephone from an off-hook state to an on-hook state.

In an embodiment of the present invention, the out-of-band channel is an RF-channel. In still another embodiment of the present invention, the VTD is DOCSIS-compliant and the out-of-band channel is a DOCSIS channel.

In an embodiment of the present invention, the system further comprises a central datastore comprising a first tuple comprising a subscriber telephone number and an assigned VTD MAC address. In this embodiment, the VTD server receives the first tuple from the central datastore and receives a second tuple comprising a read VTD MAC address and a VTD IP address from the VTD. A determination is made whether the assigned VTD MAC address matches the read VTD MAC address. If the assigned VTD MAC address matches the read VTD MAC address, the VTD server creates a third tuple comprising the subscriber telephone number and the VTD IP address and determines whether the active telephone number matches the subscriber telephone number of the third tuple. If the active telephone number matches the subscriber telephone number of the third tuple, then the VTD server addresses the telephone state message to the VTD IP address.

In an embodiment of the present invention, the third tuple further comprises the read VTD MAC address.

In an embodiment of the present invention, the VTD comprises a DVR client. The DVR client receives the telephone state message and determines if the telephone state message is intended for the VTD. If the telephone state message is intended for the VTD, the DVR client obtains the data indicative of the telephone state transition from the telephone state message and generates a DVR command from the telephone state transition. The DVR client issues the DVR command to the DVR, thereby controlling the DVR in response to the telephone state transition.

In another embodiment of the present invention, if the telephone state message is not intended for the VTD, the DVR client sends an error message to the VTD server.

In an embodiment of the present invention, a telephone state transition comprises a change of a telephone from an on-hook state to an off-hook state and the DVR command comprises a PAUSE command. In yet another embodiment of the present invention, the telephone state transition comprises a change of a telephone from an off-hook state to an on-hook state and the DVR command comprises a PLAY command.

In an embodiment of the present invention, the VTD comprises a set top box. In another embodiment of the present invention, the VTD comprises a cable-ready video display device.

In an embodiment of the present invention, a system for controlling a digital video recorder (DVR) in response to a telephone state transition comprises a telephone, a DVR responsive to infrared commands, and an infrared signaling monitor connected to the telephone. In this embodiment, the infrared signaling monitor detects a telephone state transition from an on-hook state to an off-hook state and sends an infrared PAUSE command to the DVR. The infrared signaling monitor detects a telephone state transition from an off-hook state to an on-hook state, and sends an infrared PLAY command to the DVR.

In an embodiment of the present invention, the telephone and infrared signaling monitor are standalone devices. In another embodiment of the present invention, the telephone is a wired telephone. In yet another embodiment of the present invention, the telephone is a cordless telephone.

An embodiment of the present invention provides a method for controlling a digital video recorder (DVR) in response to a telephone state transition. In this embodiment, a telephone state transition from an on-hook state to an off-hook state is detected. An infrared PAUSE command is sent to the DVR. A telephone state transition from an off-hook state to an on-hook state is detected. An infrared PLAY command is sent to the DVR.

In an embodiment of the present invention, the telephone and infrared signaling monitor are standalone devices. In another embodiment of the present invention, the telephone is a wired telephone. In yet another embodiment of the present invention, the telephone is a cordless telephone.

DETAILED DESCRIPTION

Figure 1:
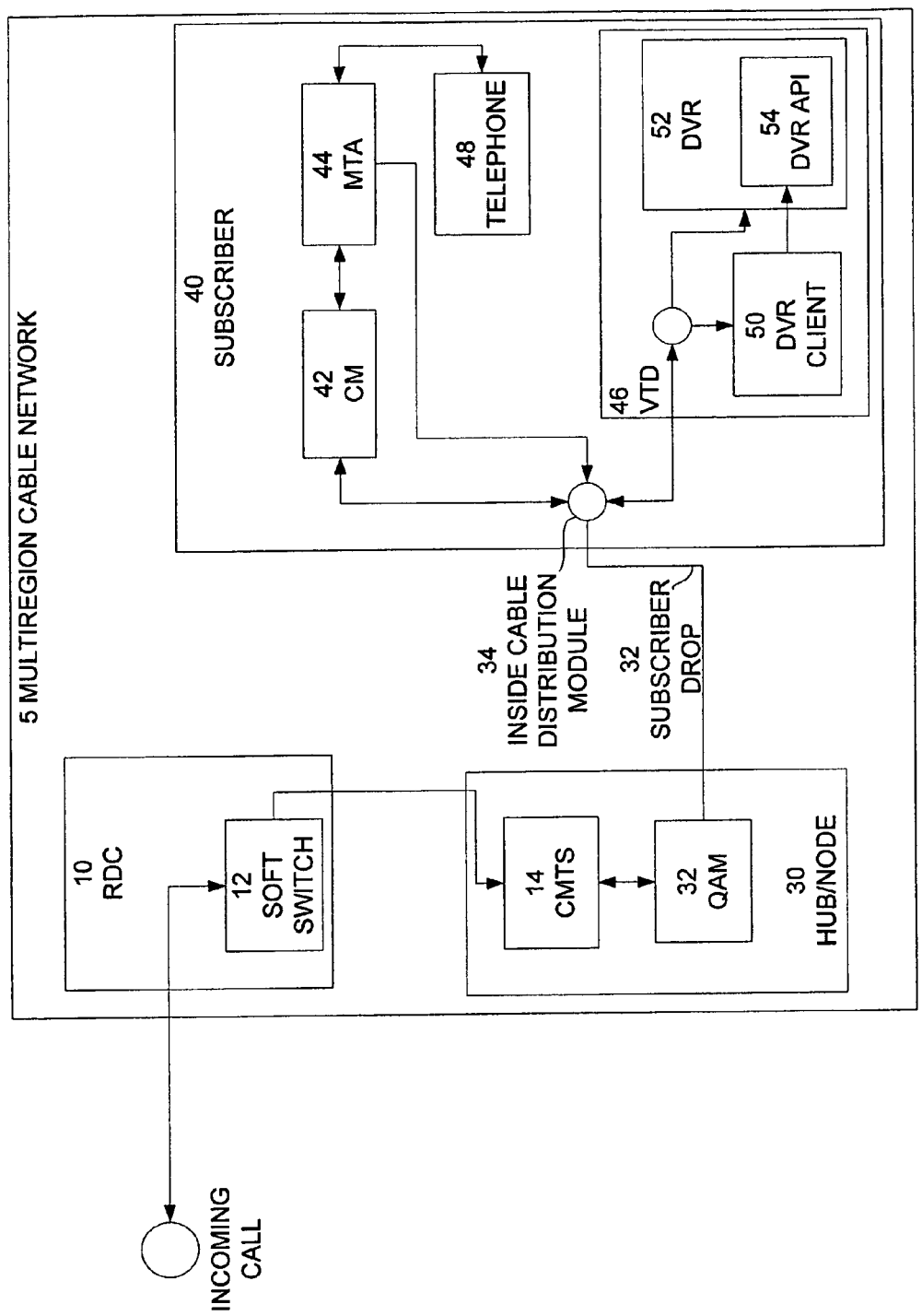
FIG. 1 illustrates a block diagram of high-level components used to provide control signals to a digital video recorder through a media terminal adapter according to an embodiment of the present invention.

The following terms are used in the description that follows. The definitions are provided for clarity of understanding:

digital telephone subscriber—Digital telephone subscriber.
DOCSIS—"Data Over Cable Service Interface Specification" issued by Cable Television Laboratories, Inc.
DVR—Digital video recorder.
offhook—a state of a telephone in which the telephone is able to send voice and signaling data over a network to which it is connected.
onhook—a state of a telephone in which the telephone may receive a ringing signal but cannot send voice and signaling data.
SIP—Session Initiation Protocol. SIP uses structured messages to initiate and complete transactions.
Soft switch—A soft switch integrates the Internet telephony and circuit-switched worlds. Typically, a soft switch duplicates Class 4 and 5 switch capabilities and operates in the classic public network environment where call control is separate from media flow.
Telephone state information—information as to the transition of a telephone from the onhook state to the offhook state and from the offhook state to the onhook state.
UDP—User datagram protocol.
VTD—Video termination device. A VTD comprises a standalone video termination device and components that perform the function of a video termination device that are integrated into other devices, such as television sets, video monitors, and other devices.

As will be appreciated by those skilled in the art, references to discrete components such as MTA, set top box, cable modem, telephone, television, video display device and DVR are directed to the functionality such devices provide. Devices in which any of these components are integrated are also within the scope of the present invention. By way of illustration and not as a limitation, the MTA may be integrated in the VTD. Alternatively, the functions of the DVR and set top box may be incorporated into a cable-ready television with the security and access functions performed by an external PCMCIA type card. See, OpenCable™ Multistream CableCARD Interface Specification OC-SP-MC-IF-I02-040831.

In an embodiment of the present invention, the signaling associated with the answering or initiation of a digital telephone call by a digital telephone subscriber is used to instruct a video termination device (VTD) comprising a digital video recorder (DVR) to record a program that is being viewed by the digital telephone subscriber. In this embodiment, a signal is generated by an MTA when the telephone is enters an "off-hook" state and sent to the DVR to initiate recording of a program being viewed by a subscriber. When the phone goes "on-hook," the subscriber resumes watching the program from exactly where it was interrupted. In one embodiment of the present invention, the MTA is connected directly to the VTD/DVR and the telephone state is determined by the DVR from information provided by the MTA.

In yet another embodiment of the present invention, a soft switch monitors signaling from the MTA indicative of the state of a telephone. A telephone state message comprising the telephone state information is then over the out-of-band channel/path to a DVR client within the VTD. The VTD uses the telephone state information to control a DVR.

FIG. 1 illustrates a block diagram of high-level components used to provide control signals to a digital video recorder through a media terminal adapter according to an embodiment of the present invention. Referring to FIG. 1, multi-region cable network 5 comprises a regional data center 10, hub/node 30, and subscriber 40. Regional data center 10 comprises softswitch 12. Hub/node 30 comprises CMTS 14 and QAM modem 32. Soft switch 12 receives incoming and outgoing calls for CMTS 14.

Subscriber 40 is connected to hub/node 30 via subscriber drop 32. Inside cable distribution module 34 provides a path to cable modem (CM) 42 and video terminal device (VTD) 46. CM 42 is connected to telephone 48 via MTA 44. VTD comprises a digital video recorder (DVR) 52 and a DVR client 50. DVR 52 comprises a DVR application programming interface (API) 54. MTA 44 comprises a return path to the inside cable distribution module 34 so as permit communication between the MTA 44 and DVR client 50. DVR client 50 is adapted to receive messages from MTA 44 over an out-of-band channel.

A telephone call follows a path from soft switch 12, to CMTS 14, to QAM modem 32, to cable modem 42, to MTA 44 to telephone 48. In an embodiment of the present invention, MTA 44 provides DVR client 50 change of state information of telephone 48. In an embodiment of the present invention, change of state information comprises a transition from an "on-hook" state to an "off-hook" state (indicating the initiation or answering of a call), and a transition from an "off-hook" state to an "on-hook" state (indicating the termination of a call).

DVR API 54 is adapted to enable an application to schedule and record a program in a time-shift buffer or in real-time. Applications create recordings by calling the RECORD( ) method of the a RECORDING-MGR object of the DVR 52. DVR client 50 interprets change of state information from MTA 44 and to uses the change of state information to issue calls to DVR API 54 to control the DVR's functions.

In an embodiment of the present invention, a change of state of telephone 48 from "on-hook" to "off-hook" causes the DVR client 50 to issue a "PAUSE" call to DVR API 54. The DVR 52 is adapted to respond to the PAUSE command according to the mode in which the DVR 52 is being used. If the DVR 52 is being used to watch a program from the memory of the DVR 52, the DVR 52 pauses the playback of the program. If the DVR 52 is being used to watch a program from another source, the PAUSE command causes the DVR 52 to pause the program and begin or continue (as the case may be for various commercial DVR embodiments) recording the program in the DVR 52 memory (not illustrated).

A change of state of telephone 48 from "off-hook" to "on-hook" causes the DVR client 50 to issue a "PLAY" call to DVR API 54. The DVR 52 is further adapted to respond to the PLAY command according to the mode in which the DVR 52 is being used. If, prior to the sending of the PAUSE command, the DVR 52 was being used to watch a program from the memory of the DVR 52, then the PLAY command causes the DVR 52 to resume playback of the program. If, prior to the sending of the PAUSE command, the DVR 52 was being used to watch a program from another source, the PAUSE command causes the DVR 52 to playback the program from the memory of the DVR 52 while recording of the program continues.

In another embodiment of the present invention, the MTA 44 additionally provides the DVR client 50 with caller identifying (CID) information. CID information comprises the telephone number of the calling party. In another embodiment of the present invention, the CID information further comprises a label associated with the telephone number of the calling party. By way of illustration and not as a limitation, the label comprises a calling party name The DVR client 50 provides the CID information to the VTD 46 for display on a display device (not illustrated).

In an alternate embodiment of the present invention, MTA 44 is integrated with VTD 46. In this embodiment, the MTA 44 communicates with DVR client 50 via a bus or other pathway internal to VTD 46.

Figure 2:
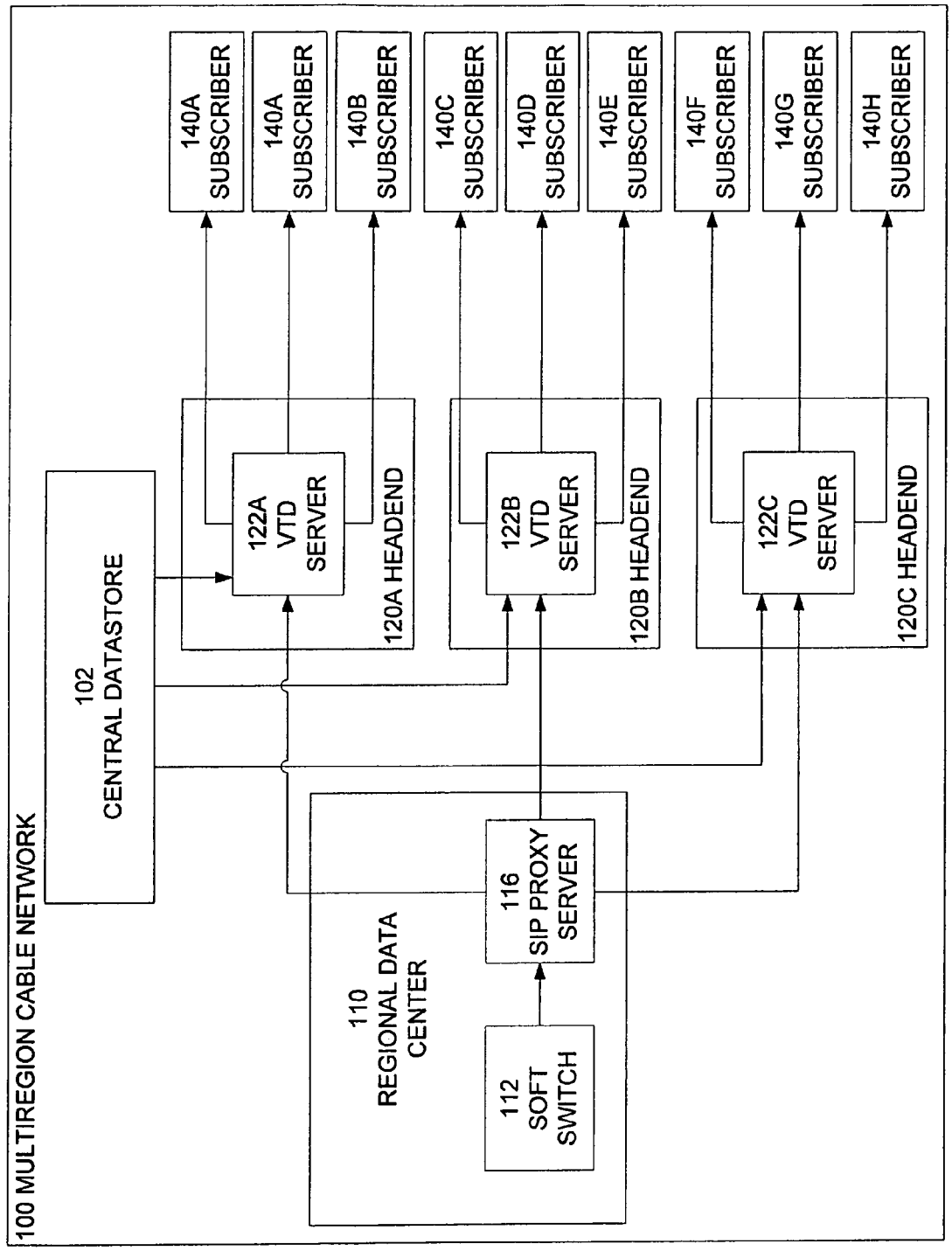
FIG. 2 illustrates a block diagram of high-level components used to provide control signals to a digital video recorder through a VTD server according to an embodiment of the present invention.

FIG. 2 illustrates a block diagram of high-level components used to provide control signals to a digital video recorder through a VTD server according to an embodiment of the present invention. Referring to FIG. 2, multi-region cable network (MRCN) 100 comprises a central datastore 102, a regional data center 110, headends 120A, 120B, and 120C, and subscribers 140A-H. A soft switch 112 and a proxy server 116 reside in the regional data center 110. Regional data center 110 provides data services to multiple headends 120A, 120B, and 120C. Each headend 120A-C comprises a VTD server 122A-C. Each VTD server 122A-C services a plurality of subscribers (subscribers 140A-H are illustrated).

In an embodiment of the present invention, telephone state information is relayed from a subscriber's MTA (see FIG. 3) to the soft switch 112. Soft switch 112 then creates a telephone state message comprising the telephone state information and sends it to VTD servers 122A-C using SIP (Session Initiation Protocol) via SIP proxy server 116. In an embodiment of the present invention, the VTD servers 122A-C push telephone state information to the video termination devices via a QPSK modem (see FIG. 3) within the hub/node that serves the head end where a particular VTD server resides. However, this is not meant as a limitation. As will be described below, other transmission paths may be used to convey the telephone state information to a VTD.

In another embodiment of the present invention, the telephone state message created by soft switch 112 further comprises caller identifying (CID) information. CID information comprises the telephone number of the calling party. In another embodiment of the present invention, the CID information further comprises a label associated with the telephone number of the calling party. By way of illustration and not as a limitation, the label comprises a calling party name.

The proxy server 116 is interposed between these elements and is responsible for distributing the SIP INVITE messages generated by the softswitch 112 to the VTD servers 122A-C that communicate with to the VTDs (not illustrated) of subscribers 140A-H. Central datastore 102 comprises information relating telephone number(s) of a digital telephone subscriber to the MAC address(es) of the VTDs assigned to that subscriber. The information in central datastore 102 is used by VTD servers 122A-C to send the telephone state messages to the proper VTD.

Figure 3:
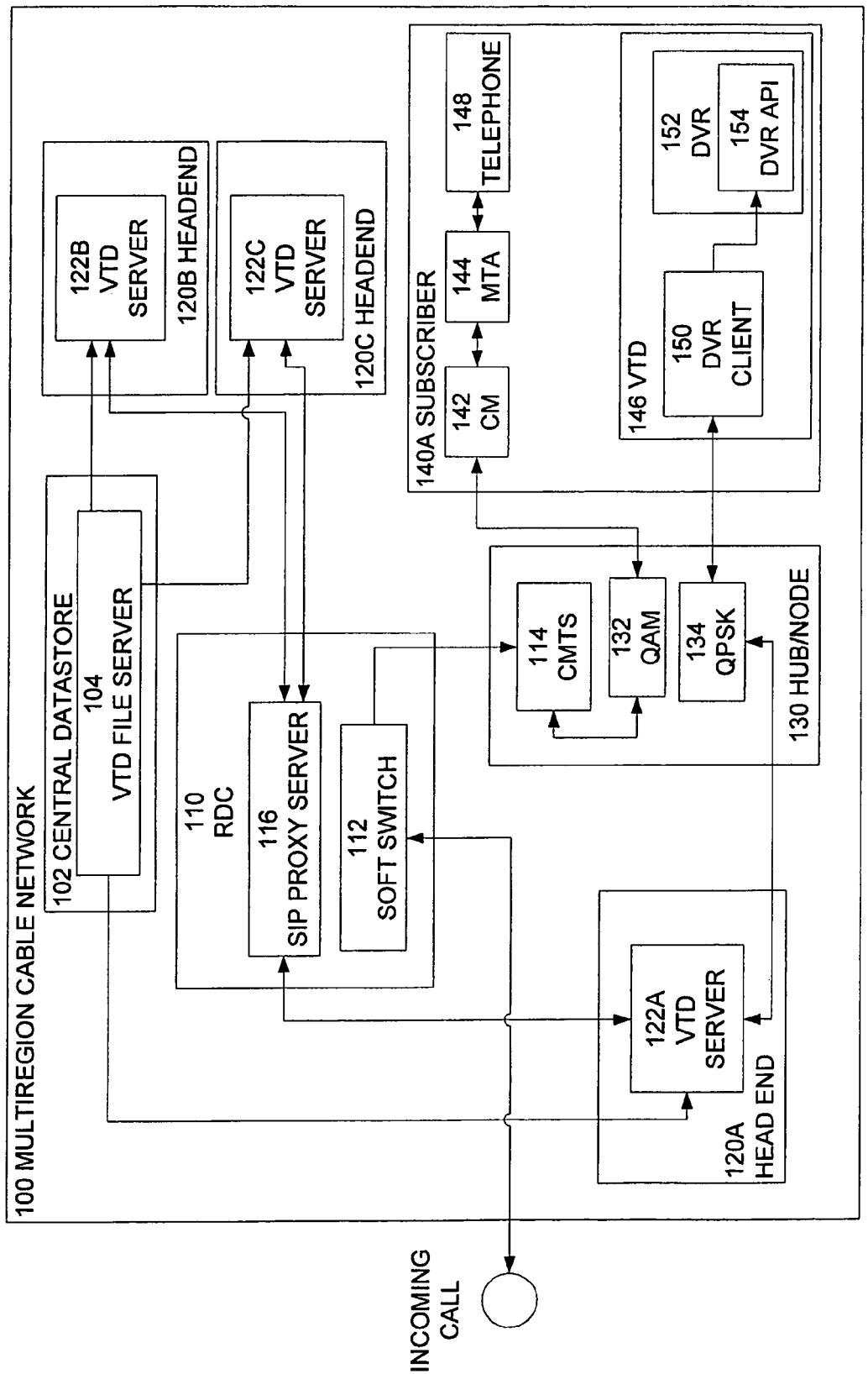
FIG. 3 further illustrates a block diagram of high-level components used to convey telephone state information to a video termination device (VTD) in a multi-region cable network according to an embodiment of the present invention.

FIG. 3 further illustrates a block diagram of high-level components used to convey telephone state information to a video termination device (VTD) in a multi-region cable network according to an embodiment of the present invention. Referring to FIG. 3, multi-region cable network 100 comprises a central datastore 102, a regional data center 110, headends 120A, 120B, and 120C, hub/node 130, and subscriber 140A. Subscriber 140 comprises cable modem (CM) 142, MTA 144, video termination device (VTD) 146 and telephone 148.

Regional data center 110 comprises softswitch 112 and SIP proxy server 116. Hub/node 130 comprises CMTS 114, a QAM modem 132 and a QPSK modem 134. VTD server 122A is connected to hub/node 130, which is connected to subscriber 140A. Regional data center 110 services multiple headends 120A, 120B, and 120C. Central datastore 102 comprises information relating telephone number(s) of a digital telephone subscriber to the MAC address(es) of the VTDs assigned to that subscriber.

In an embodiment of the present invention, central datastore 102 generates a file of digital telephone subscribers and writes the file to a VTD file server 104. In this embodiment, the file comprises a tuple binding a subscriber's phone number(s) and a set of assigned VTD MAC addresses.

Soft switch 112 receives incoming and outgoing calls for CMTS 114. SIP proxy server 116 serves to forward (bridge) SIP traffic from soft switch 112 to VTD servers 122A-C within headends 120A-C. This bridging function allows soft switch 112 to serve additional head ends for which the specific routing information is not known by soft switch 112. Soft switch 112 is adapted to fork SIP-INVITE message traffic to a plurality of SIP proxy servers. In an embodiment of the present invention, soft switch 112 is a Cisco BTS-series soft switch and SIP proxy server 116 is a Cisco CSPS-series proxy server. However, this is not meant as a limitation.

Head end 120A comprises VTD server 122A, which performs the translation of SIP traffic into a UDP telephone state message. In an embodiment of the present invention, the format of the telephone state message is selected to efficiently use an out-of-band IP network to send the telephone state message to VTD client 150.

Subscriber 140 comprises cable modem (CM) 142, MTA 144, video termination device (VTD) 146 and telephone 148. VTD 146 comprises a DVR client 150 that is adapted to parse the information in the telephone state message to acquire the change of state information from soft switch 112. DVR client 150 uses the change of state information to issue calls to DVR API 154 to control the operation of DVR 152.

In an embodiment of the present invention, a change of state of telephone 148 from "on-hook" to "off-hook" causes the DVR client 150 to issue a "PAUSE" call to DVR API 154 to record a program being viewed by digital telephone subscriber. A change of state of telephone 148 from "off-hook" to "on-hook" causes the DVR client 150 to issue a "PLAY" call to DVR API 154.

The DVR 152 is adapted to respond to the PAUSE command according to the mode in which the DVR 152 is being used. If the DVR 152 is being used to watch a program from the memory of the DVR 152, the DVR 152 pauses the playback of the program. If the DVR 152 is being used to watch a program from another source, the PAUSE command causes the DVR 152 to pause the program and begin or continue (as the case may be for various commercial DVR embodiments) recording the program in the DVR 152 memory (not illustrated).

A change of state of telephone 148 from "off-hook" to "on-hook" causes the DVR client 150 to issue a "PLAY" call to DVR API 154. The DVR 152 is further adapted to respond to the PLAY command according to the mode in which the DVR 152 is being used. If, prior to the sending of the PAUSE command, the DVR 152 was being used to watch a program from the memory of the DVR 152, then the PLAY command causes the DVR 152 to resume playback of the program. If, prior to the sending of the PAUSE command, the DVR 152 was being used to watch a program from another source, then the PAUSE command causes the DVR 152 to playback the program from the memory of the DVR 152 while recording of the program continues.

In another embodiment of the present invention, the telephone state message further comprises caller identifying (CID) information. CID information comprises the telephone number of the calling party. In another embodiment of the present invention, the CID information further comprises a label associated with the telephone number of the calling party. By way of illustration and not as a limitation, the label comprises a calling party name. The DVR client 150 parses the telephone state message to obtain the CID information. The CID information is then provided to VTD 146 for display on a display device (not illustrated).

A telephone call follows a path from soft switch 112, to CMTS 114, to QAM modem 132, to cable modem 142, to MTA 144 to telephone 148. In an embodiment of the present invention, when a call is initiated or received by telephone 148, soft switch 112 monitors telephone state information of telephone 148 as sent by MTA 144. When the state changes, software switch 112 creates a telephone state message comprising the state information of telephone 148. The telephone state message is directed to the VTD associated with the telephone number for which telephone state information is being monitored through VTD server 122A.

Telephone state messages follow a path from the soft switch 112, to SIP proxy server 116, to VTD server 122A, to QPSK modem 134 to DVR client 150. However, this is not meant as a limitation. In an alternate embodiment of the present invention, a telephone state message may be directed to CMTS 114. In this embodiment, DVR client 150 is DOCSIS-compliant and receives the telephone state message via QAM modulator 132. This path is discussed below in the context of FIG. 6.

In an embodiment of the present invention, VTD server 122A within headend 120A obtains a list from VTD file server 104 of the digital telephone subscribers that receive video services from multi-region cable network 100. The digital telephone subscriber list correlates a subscriber's telephone number(s) and a set of VTD MAC addresses assigned to that subscriber.

DVR client 150 registers with VTD server 122A by providing the VTD server 122A a "read" MAC address and an IP address of the VTD 146. The VTD server 122 matches an "assigned" VTD MAC address to the "read" VTD MAC address, then creates a tuple associating the subscriber telephone number(s), read MAC address, and IP address of the VTD 146. The VTD server uses the MAC address(es) to form a tuple that associates the subscriber telephone number(s) obtained from the VTD file server 104 with "read" MAC address and IP addresses of the VTD's managed by that VTD server received from the DVR client 150 during registration.

Figure 4:
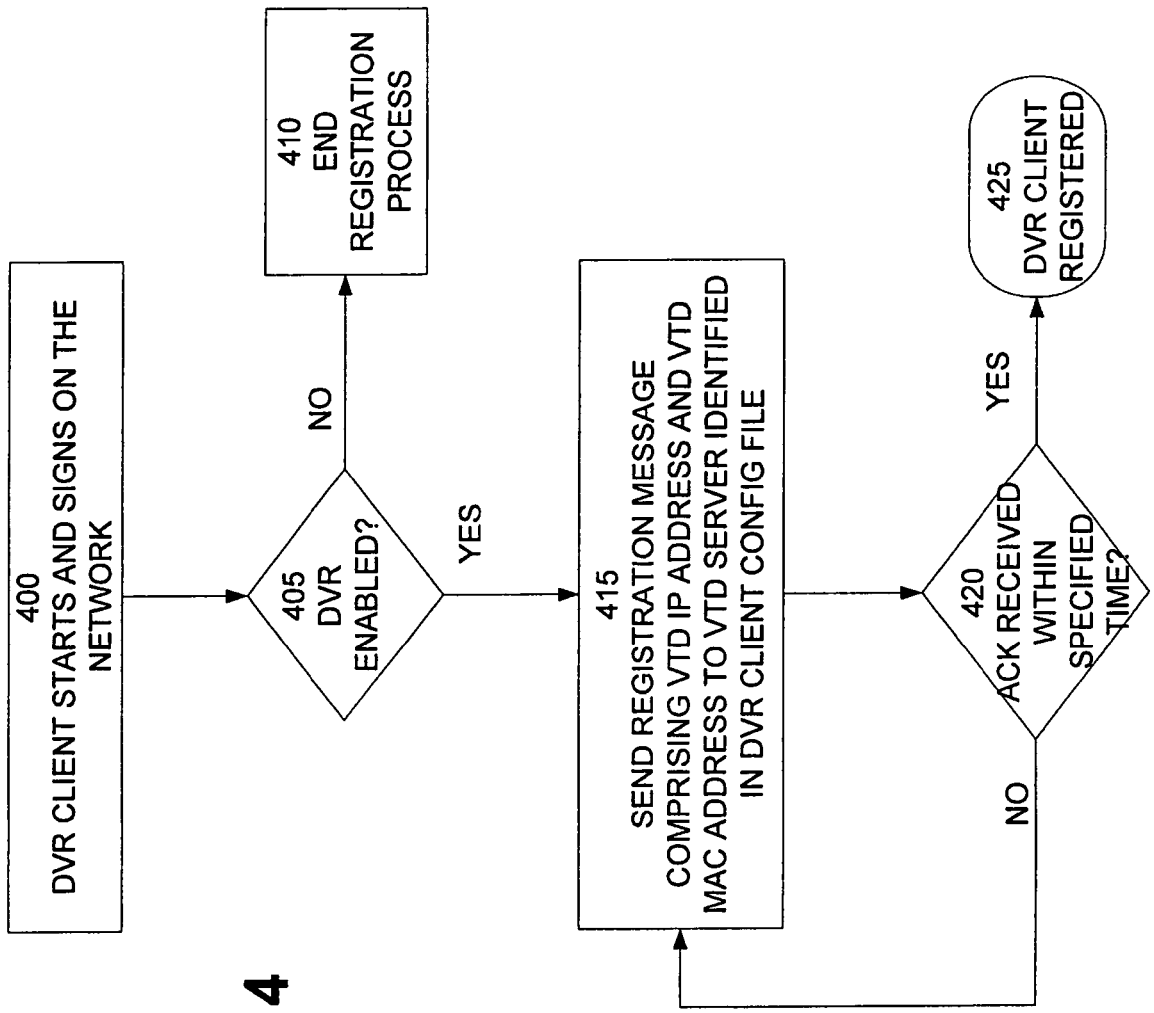
FIG. 4 illustrates a process by which a DVR client registers with a VTD server according to an embodiment of the present invention.

FIG. 4 illustrates a process by which a DVR client registers with a VTD server according to an embodiment of the present invention. A DVR client starts and signs on to the cable network 400. The DVR client receives an IP address from the cable network. A determination is made whether the caller ID service is enabled 405. If caller ID service is not enabled, the registration process ends 410. If caller ID service is enabled, DVR client sends a registration message comprising the IP address and the MAC address of the VTD associated with the DVR client. In an embodiment of the present invention, the registration message is in UDP format. However, this is not meant as a limitation. As will be appreciated by those skilled in the art, other message protocols may be used without departing from the scope of the present invention.

The VTD server maps the IP address of the VTD to the telephone number associated with the telephone state information. The telephone state message is addressed to the VTD IP address. In an embodiment of the present invention, the telephone state message further comprises the MAC address of the VTD. The VTD MAC and/or the VTD IP address is used by the DVR client to confirm that telephone state message is directed to the correct VTD.

A determination is made whether the DVR client has received an acknowledgement from the VTD server with a fixed period of time 420. If the acknowledgement is received, the DVR client is deemed registered with the VTD server 425. If the acknowledgement is not received within the time specified, the DVR client again sends a registration message as previously described 415.

In an embodiment of the present invention, a "Global Register Request" message is broadcast on a specific subnet to request DVR clients to re-register with the VTD server identified in the DVR client configuration file. In yet another embodiment of the present invention, to prevent sign-on "storms," a DVR client uses MAC address of the VTD on which it resides to delay sending its registration message. By way of illustration and not as a limitation, a DVR client uses the fifth byte of the VTD MAC address as the number of seconds and three times the sixth byte as the number of milliseconds that the DVR client would wait before sending a registration message. For example, a DVR client residing on an VTD with a MAC address of 01 02 03 04 05 06 would wait 5 sec 18 ms (5018 ms) before sending its registration message.

Referring again to FIGS. 2 and 3, the soft switch 112 comprises a feature set specifically for providing telephone state information to VTDs. When a subscriber 140 has the feature enabled, the soft switch 112 generates a SIP INVITE message comprising telephone state information and the subscriber telephone number associated with the telephone state information and sends the message to a SIP proxy server. In an embodiment of the present invention, the SIP INVITE message sent by the soft switch 112 comprises a feature control protocol (FCP) message body. However, this is not meant as a limitation. Other protocols may be used to convey the telephone state information and the subscriber telephone number in the SIP message body.

Each proxy server has static registrations provisioned for each VTD server that it services. When the proxy receives the INVITE message from the soft switch 112, it relays the INVITE message to the VTD servers within the headends 120A-C served by the regional data center 110 in which the soft switch 112 resides. In UNIX terminology, the proxy "forks" the INVITE message request across all VTD servers 122A-C.

Each VTD server that receives the INVITE message determines whether the subscriber associated with the telephone number for which telephone state information being monitored is registered with that VTD server. A VTD server that actually manages the subscriber that belongs to the number for which telephone state information is being monitored responds with a "200 OK" message. On reception of the 200 OK message, the proxy server issues a CANCEL message to cancel any other forked requests that went to other VTD servers and relays the 200 OK message back to the soft switch 112. The soft switch 112 sends an "ACK" message acknowledging the 200 OK followed by a "BYE" message terminating the session.

The soft switch 112 generates two additional types of INVITE messages. The first is the INVITE message generated on a periodic basis as a "keep-alive" message between the soft switch 112 and the SIP proxy server 116. The keep-alive allows the soft switch 112 to insure that the SIP proxy server 116 is accessible and that the SIP application is active. As explained below, the SIP proxy server 116 responds to a keep-alive message with a "404" NOT FOUND RESPONSE CODE. The soft switch 112 interprets the "404" response as an indication that the feature server is accessible and active. A second type of INVITE message is generated when the soft switch 112 is restarted for any reason. Like the keep-alive INVITE message, SIP proxy server 116 responds to this INVITE message with a "404" NOT FOUND RESPONSE.

The three types of INVITE messages are differentiated by the SIP proxy server 116 using the "Request URI" in the INVITE message. For the INVITE message destined for a VTD server, the Request URI user field comprises a "user value" of "fs". However, this is not meant as a limitation. The SIP proxy server responds to this user value by forwarding (forking) the INVITE message in a parallel manner to all the VTD servers registered to that "user". The other two INVITE messages have different RequestURI user values. A SIP proxy server is not be populated with any routing rules for these "users" resulting in the "404" responses being generated by the SIP proxy server and returned to the soft switch 112.

In an embodiment of the present invention, the message body for the INVITE message uses FCP. The FCP body comprises telephone state information. In another embodiment of the present invention, the INVITE message further comprises CID information. In this embodiment, the CID information comprises a called party phone number (CalledPN), a calling party phone number (CallingPN), and SubName, SubId and Privacy parameters. The CalledPN indicates the subscriber to whom the call is destined. The CallingPN is the calling party number while the SubName and SubId fields comprise other calling party identifying information. The Privacy parameter indicates whether and how the Telephone state information is restricted for this number as follows:

- Off—No Privacy is requested; both CallingPN and other calling party identifying information may be displayed on the client VTD.
- Name—The CallingPN is replaced with the string "Private" when passed to the client. Other calling party identifying information may be displayed.
- Full—The calling party identifying information is replaced with the string "Private" when passed to the VTD client.

Figure 5:
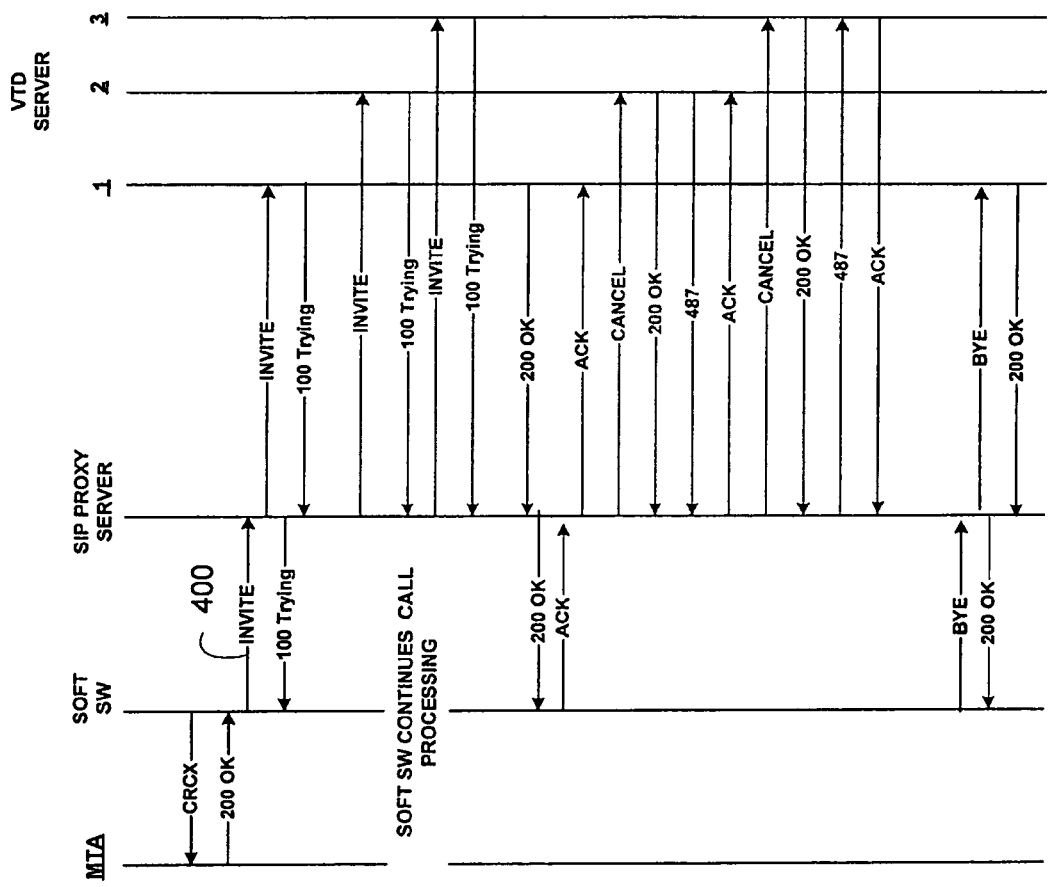
FIG. 5 illustrates a message flow within a caller ID-enabled cable network according to embodiments of the present invention.

FIG. 5 illustrates a message flow with a cable network according to embodiments of the present invention. Referring to FIG. 3 and FIG. 5, the soft switch 112 invokes a new message sequence for each change in the telephone state information it detects is from a subscriber on the cable network. The soft switch 112 generates an INVITE message with an FCP message body that is directed through a SIP proxy server 116 to one or more VTD servers. The soft switch 112 then continues with normal call processing. This insures that if for some reason a problem occurs with the processing for the INVITE message by the proxy or VTD server(s) that the call processing is not interrupted.

FIG. 5 illustrates an exemplary embodiment in which the SIP proxy server forks the INVITE message to three different VTD servers (1, 2 and 3). Each VTD server parses the FCP INVITE message body to determine whether the telephone number associated with the telephone state information represents a subscriber telephone number for which the particular VTD server is responsible. As illustrated in FIG. 5, VTD server 1 recognizes that it is responsible for the user identified by the CalledPN. VTD server 1 responds to the INVITE message with a "200" OK message. The SIP proxy server then cancels the other call legs to VTD servers 2 and 3 and forwards the answer from VTD server 1 back to the soft switch 112 (see, FIG. 3).

A subscriber may register multiple VTDs and associate each VTD with the same or a different telephone number. The telephone state message is sent to the IP address of the DVR client residing in each VTD associated with the telephone number to which the telephone state information pertains.

In an embodiment of the present invention, the MAC address of VTD is also carried in the telephone state message. The DVR client compares the MAC address in the telephone state message to the MAC address of the VTD in which the DVR client resides. If the MAC addresses do not match, then the DVR client does not issue commands to the DVR API. Rather, the DVR client sends a "Wrong MAC" message to the VTD server advising the VTD server of the incorrect mapping. The DVR client sends a Register message to associate its IP address with the MAC address of the VTD in which the DVR client resides.

Referring again to FIG. 3, in an embodiment of the present invention, the VTD server 122 adheres to the standard Mystro Application Component (MAS) design architecture. This architecture provides conductor interactions, database connectivity, and CORBA messaging for relatively little development cost. This architecture further allows the VTD server 122 to reside on its own hardware, allowing the VTD server 122 to be scaled independently of other network components.

In an exemplary embodiment of the present invention, the VTD server 122 is a Java application run on a Linux platform, using JacORB as its communication protocol. The MAS database is Oracle 9i. The VTD server hardware a Sun V65 with dual 2.4 GHz Intel Pentium processors with 2 GB of RAM. As will be appreciated by those skilled in the art, other languages, platforms, databases, and hardware may used to implement embodiments of the present invention without departing from its scope.

In yet another embodiment of the present invention, the security is provided using IPSEC, or IP-level Security. This means that that traffic is physically secure between the routers and is transparent to VTD server 122. Transfers of files from VTD file server 104 require the standard user/password authentication. In an alternate embodiment of the present invention, SecureCopy is used to encrypt file data retrieved from the VTD file server prior to transport.

In an embodiment of the present invention, VTD is DOCSIS-compliant. As a consequence, VTD comprises an IP address that permits messages to be directed to the VTD from the CMTS.

Figure 6:
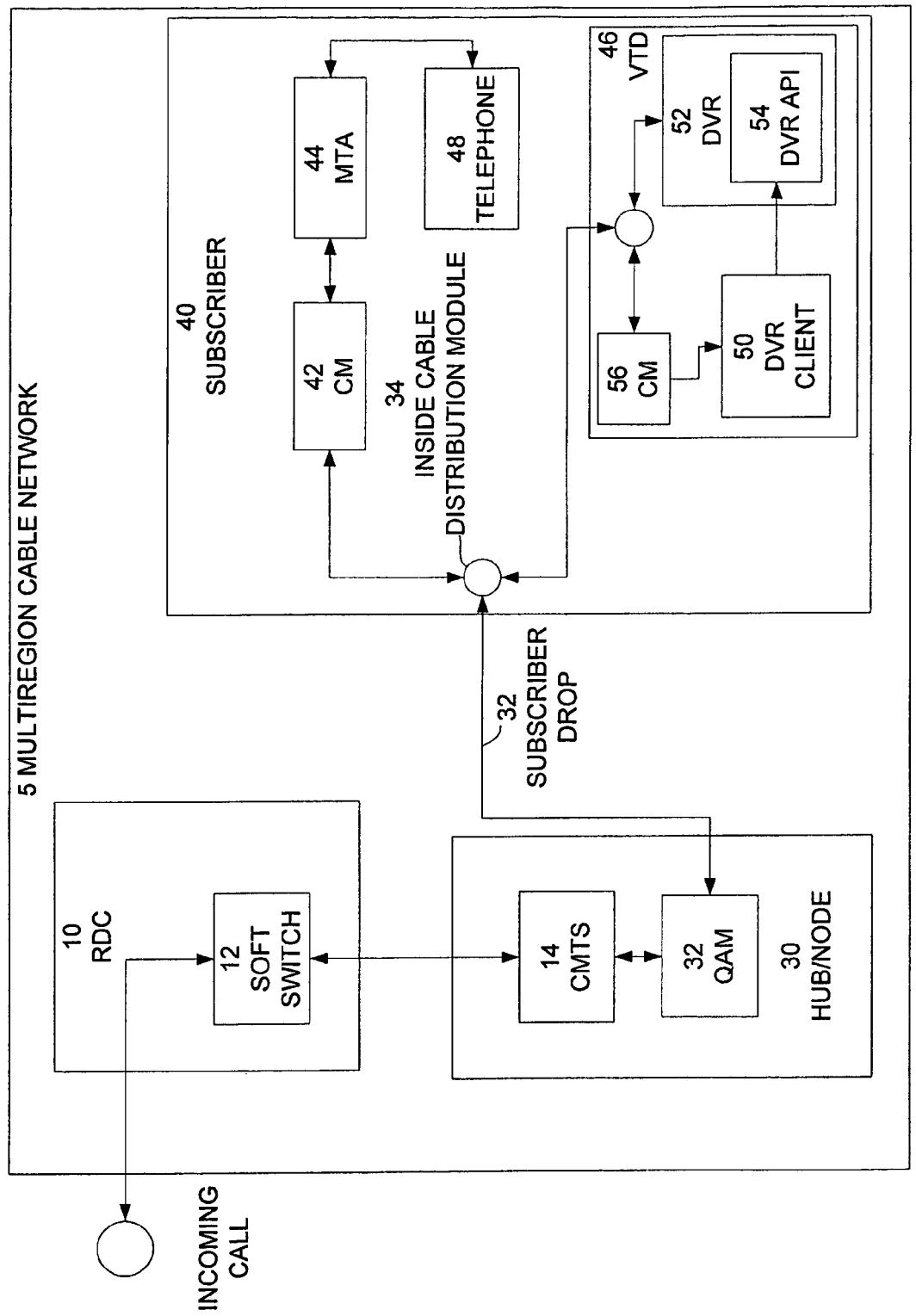
FIG. 6 illustrates a block diagram of high-level components used to convey telephone state information to a DOCSIS-compliant video termination device (VTD) in a multi-region cable network according to an embodiment of the present invention.

FIG. 6 illustrates a block diagram of high-level components used to convey telephone state information to a DOCSIS-compliant video termination device (VTD) in a multi-region cable network according to an embodiment of the present invention. Referring to FIG. 6, multi-region cable network 5 comprises a regional data center 10, hub/node 30, and subscriber 40. Regional data center 10 comprises softswitch 12. Hub/node 30 comprises CMTS 14 and QAM modem 32. Soft switch 12 receives incoming and outgoing calls for CMTS 14.

Subscriber 40 is connected to hub/node 30 via subscriber drop 32. Inside cable distribution module 34 provides a path to cable modem (CM) 42 and video terminal device (VTD) 46. CM 42 is connected to telephone 48 via MTA 44. VTD comprises a cable modem 56, a digital video recorder (DVR) 52 and a DVR client 50. DVR client 50 is adapted to receive messages from MTA 44 addressed to CM 56. DVR 52 comprises a DVR application programming interface (API) 54.

A telephone call follows a path from soft switch 12, to CMTS 14, to QAM modem 32, to cable modem 42, to MTA 44 to telephone 48. In an embodiment of the present invention, MTA 44 provides DVR client 50 change of state information of telephone 48 by addressing a telephone state message to cable modem 56. In an embodiment of the present invention, change of state information comprises a transition from an "on-hook" state to an "off-hook" state (indicating the initiation or answering of a call), and a transition from an "off-hook" state to an "on-hook" state (indicating the termination of a call).

DVR API 54 is adapted to enable an application to schedule and record a program in a time-shift buffer or in real-time. Applications create recordings by calling the RECORD( ) method of the a RECORDING-MGR object of the DVR. In an embodiment of the present invention, DVR client 50 interprets change of state information from MTA 44 and to uses the change of state information to issue calls to DVR API 54 to control the DVR's functions. In an embodiment of the present invention, a change of state of telephone 48 from "on-hook" to "off-hook" causes the DVR client 50 to issue a "PAUSE" call to DVR API 54. The DVR 52 is adapted to respond to the PAUSE command according to the mode in which the DVR 52 is being used. If the DVR 52 is being used to watch a program from the memory of the DVR 52, the DVR 52 pauses the playback of the program. If the DVR 52 is being used to watch a program from another source, the PAUSE command causes the DVR 52 to pause the program and begin or continue (as the case may be for various commercial DVR embodiments) recording the program in the DVR 52 memory (not illustrated).

A change of state of telephone 48 from "off-hook" to "on-hook" causes the DVR client 50 to issue a "PLAY" call to DVR API 54. The DVR 52 is further adapted to respond to the PLAY command according to the mode in which the DVR 52 is being used. If, prior to the sending of the PAUSE command, the DVR 52 was being used to watch a program from the memory of the DVR 52, then the PLAY command causes the DVR 52 to resume playback of the program. If, prior to the sending of the PAUSE command, the DVR 52 was being used to watch a program from another source, then the PAUSE command causes the DVR 52 to playback the program from the memory of the DVR 52 while recording of the program continues.

In another embodiment of the present invention, the telephone state message created by MTA 44 additionally provides the DVR client 50 with caller identifying (CID) information. CID information comprises the telephone number of the calling party. In another embodiment of the present invention, the CID information further comprises a label associated with the telephone number of the calling party. By way of illustration and not as a limitation, the label comprises a calling party name. The DVR client 50 parses the telephone state message to obtain the CID information and then provides the CID information to the VTD 46 for display on an display device (not illustrated).

In an embodiment of the present invention, when MTA 44 boots, it receives its MTA configuration file comprising a fully qualified domain name (FQDN) for the VTD of the subscriber to whom the MTA is assigned. When the MTA 44 detects a change of state of telephone 48, the MTA 44 sends an IP-based messaged to the VTD 46 (via the CMTS 14) that commands the DVR 52 to start/stop recording the currently-viewed channel.

Figure 7:
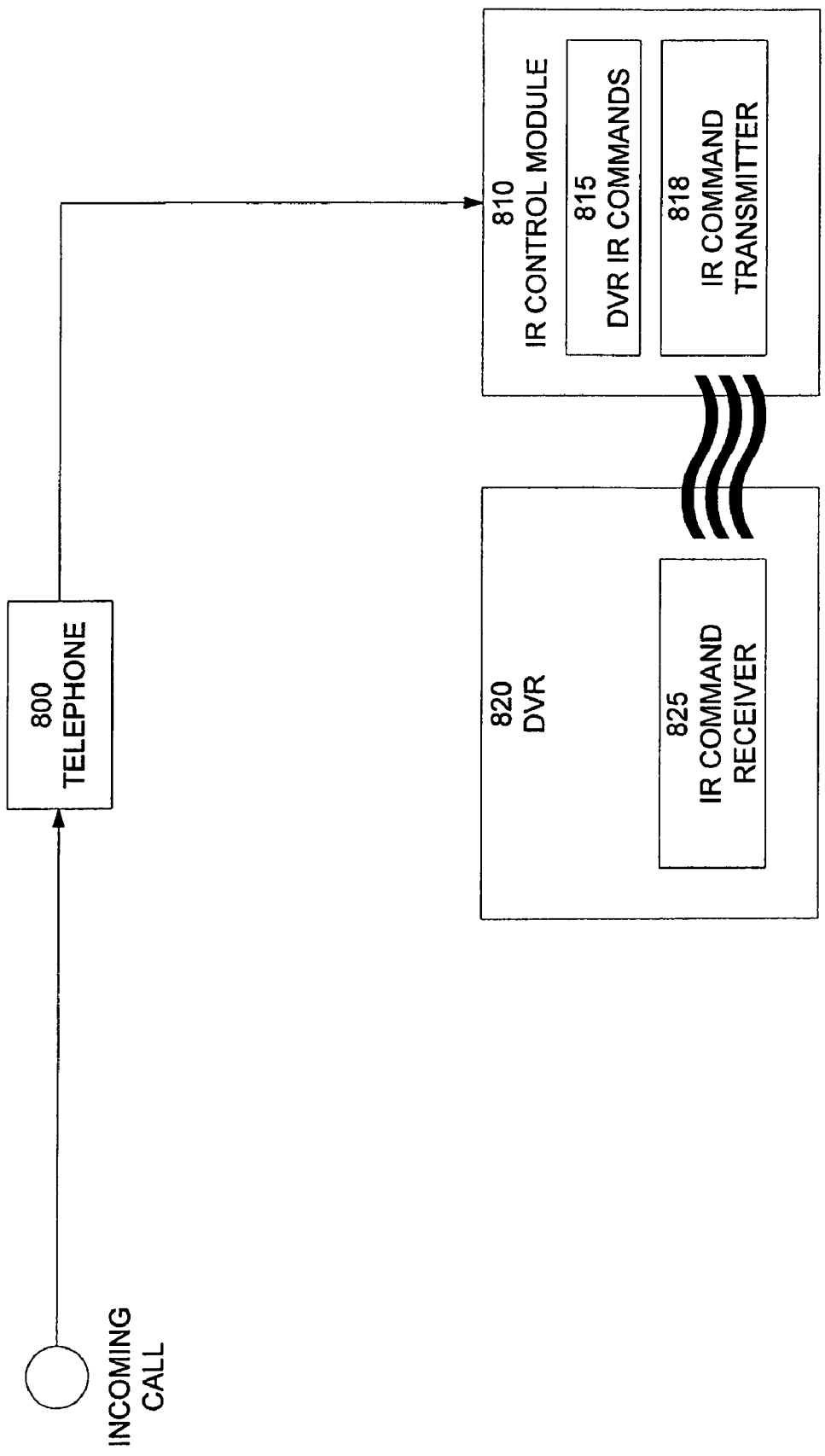
FIG. 7 illustrates a block diagram of an infrared signaling module used to convey commands to a DVR in response to a change of state of telephone according to an embodiment of the present invention.

As will be appreciated by those skilled in the art, other means of sending commands to DVR 52 in response to a change of state of telephone 48 may be used without departing from the scope of the present invention. FIG. 7 illustrates a block diagram of an infrared signaling module used to convey commands to a DVR in response to a change of state of telephone according to an embodiment of the present invention. In this embodiment of the present invention, telephone 800 is connected to a standalone infrared (IR) signaling module 810. Telephone 800 may be a wired or cordless telephone. IR signaling module 810 comprises an IR command set 815 of DVR 820 and IR command transmitter 818. The IR signaling module 810 is adapted to detect a change of state of telephone 800 and to issue an IR command to DVR 820 via IR command transmitter 818 in response thereto. IR command receiver 825 within DVR 820 receives the IR command.

In this embodiment, a change of state of telephone 800 from "on-hook" to "off-hook" causes the infrared signaling module 810 to issue a "PAUSE" IR-command to DVR 820. The DVR 820 is adapted to respond to the PAUSE command according to the mode in which the DVR 820 is being used. If the DVR 820 is being used to watch a program from the memory of the DVR 820, the DVR 820 pauses the playback of the program. If the DVR 820 is being used to watch a program from another source, the PAUSE command causes the DVR 820 to pause the program and begin recording the program in the DVR 820 memory (not illustrated).

A change of state of telephone 800 from "off-hook" to "on-hook" causes the infrared signaling module 810 to issue a "PLAY" IR-command to DVR 820. The DVR 820 is further adapted to respond to the PLAY command according to the mode in which the DVR 820 is being used. If, prior to the sending of the PAUSE command, the DVR 820 was being used to watch a program from the memory of the DVR 820, then the PLAY command causes the DVR 820 to resume playback of the program. If, prior to the sending of the PAUSE command, the DVR 820 was being used to watch a program from another source, then the PAUSE command causes the DVR 820 to playback the program from the memory of the DVR 820 while recording of the program continues.

A system and method for controlling a DVR on a cable network has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for controlling a digital video recorder (DVR) in response to a telephone state transition comprising:
   detecting a telephone state transition at a media terminal adaptor (MTA);
   creating a message comprising data indicative of the telephone state transition;
   sending the message in an out-of-band channel from the MTA to a DVR client, wherein the DVR client and the DVR reside in a video termination device (VTD);
   creating a command at the DVR client from the telephone state transition; and
   issuing the command from the DVR client to the DVR responsive to the telephone state transition.

2. The method of claim 1, wherein the telephone state transition comprises a change of the telephone state from an on-hook state to an off-hook state.

3. The method of claim 1, wherein the telephone state transition comprises a change of the telephone state from an off-hook state to an on-hook state.

4. The method of claim 1,
wherein the method further comprises at boot-up of the MTA, receiving a configuration file comprising a fully qualified domain name of the VTD; and
wherein sending the message to the DVR client comprises addressing the message to the VTD in which the DVR client resides using the fully qualified domain name of the VTD.

5. The method of claim 1, wherein the out-of-band channel is an RF-channel.

6. The method of claim 1, wherein the VTD is DOCSIS-compliant and the out-of-band channel is a DOCSIS channel.

7. The method of claim 2, wherein issuing the command to the DVR responsive to the telephone state transition comprises issuing a "PAUSE" command.

8. The method of claim 3, wherein issuing the command to the DVR responsive to the telephone state transition comprises issuing a "PLAY" command.

9. The method of claim 1, wherein the VTD comprises a set top box.

10. The method of claim 1, wherein the VTD comprises a cable-ready video display device.

11. A system for controlling a digital video recorder (DVR) in response to a telephone state transition in a network comprising:
a video termination device (VTD), wherein the video termination device comprises the DVR and a DVR client;
a telephone connected to the network via a media terminal adapter (MTA), wherein the MTA is adapted to:
detect a telephone state transition; and
send a telephone state message comprising data indicative of the telephone state transition to the DVR client in an out-of-band channel; and
wherein the DVR client is adapted to:
obtain the data indicative of the telephone state transition from the telephone state message;
generate a DVR command from the telephone state transition, and
issue the DVR command to the DVR, thereby controlling the DVR in response to the telephone state transition.

12. The system of claim 11, wherein the telephone state transition comprises a change of the telephone from an on-hook state to an off-hook state.

13. The system of claim 12, wherein the DVR command comprises a PAUSE command.

14. The system of claim 11, wherein the telephone state transition comprises a change of the telephone from an off-hook state to an on-hook state.

15. The system of claim 14, wherein the DVR command comprises a PLAY command.

16. The system of claim 11, wherein the telephone state message further comprises the address of the VTD in which the DVR client resides.

17. The system of claim 16, wherein the MTA is associated with a subscriber and the MTA is further adapted to receive a configuration file comprising a list of fully qualified domain names of VTDs associated with the subscriber, and wherein the address of the VTD is the fully qualified domain name of the VTD.

18. The system of claim 11, wherein the out-of-band channel is an RF-channel.

19. The system of claim 11, wherein the VTD is DOCSIS-compliant and the out-of-band channel is a DOCSIS channel.

20. The system of claim 11, wherein the VTD comprises a set top box.

21. The system of claim 11, wherein the network comprises a cable network and the VTD comprises a cable-ready video display device.

* * * * *